United States Patent [19]

Taylor et al.

[11] Patent Number: 5,741,556
[45] Date of Patent: Apr. 21, 1998

[54] PROCESS FOR PRODUCING AN OXIDE DISPERSED MCRALY-BASED COATING

[75] Inventors: Thomas Alan Taylor, Indianapolis; James Kent Knapp, Pittsboro, both of Ind.

[73] Assignee: Praxair S.T. Technology, Inc., Danbury, Conn.

[21] Appl. No.: 628,371

[22] Filed: Apr. 5, 1996

Related U.S. Application Data

[63] Continuation of Ser. No. 264,888, Jun. 24, 1994, abandoned.

[51] Int. Cl.⁶ .................................. B05D 1/08; B22F 7/00
[52] U.S. Cl. ...................... 427/453; 427/455; 427/456; 427/372.2; 427/383.1; 427/383.7; 428/552; 428/564; 428/565
[58] Field of Search ........................ 428/552, 564, 428/565; 427/446, 453, 455, 456, 372.2, 383.1, 383.7

[56] References Cited

U.S. PATENT DOCUMENTS

| | | | |
|---|---|---|---|
| 2,714,563 | 8/1955 | Poorman et al. | 117/105 |
| 2,972,550 | 2/1961 | Pelton | 117/21 |
| 3,918,139 | 11/1975 | Felten | 29/194 |
| 3,928,026 | 12/1975 | Iecht et al. | 75/134 F |
| 3,993,454 | 11/1976 | Giggins, Jr. et al. | 29/194 |
| 4,101,713 | 7/1978 | Hirsch et al. | 428/554 |
| 4,124,737 | 11/1978 | Wolfla et al. | 428/640 |
| 4,446,199 | 5/1984 | Gedwill et al. | 428/639 |
| 4,585,481 | 4/1986 | Gupta et al. | 106/14.05 |
| 4,743,462 | 5/1988 | Radzavich et al. | 427/34 |
| 4,788,077 | 11/1988 | Kang | 427/34 |
| 4,801,513 | 1/1989 | Duhl et al. | 428/678 |
| 4,822,689 | 4/1989 | Fukubayashi et al. | 428/472 |
| 4,869,936 | 9/1989 | Moskowitz et al. | 427/423 |
| 4,902,539 | 2/1990 | Jackson | 427/423 |
| 4,943,487 | 7/1990 | Benn et al. | 418/552 |
| 5,019,429 | 5/1991 | Moskowitz et al. | 427/422 |
| 5,268,045 | 12/1993 | Clare | 148/518 |
| 5,277,936 | 1/1994 | Olson et al. | 427/453 |

*Primary Examiner*—Kathryn Gorgos
*Assistant Examiner*—Chrisman D. Carroll
*Attorney, Agent, or Firm*—Robert J. Feltovic

[57] ABSTRACT

A thermal spray process for producing a MCrAlY-based coating wherein M is selected from the group consisting of iron, cobalt, nickel and mixtures thereof and wherein the oxygen in the fuel-oxidant mixture of the thermal spray process converts a substantial portion of the yttrium component to $Y_2O_3$, a minor portion of the aluminum component to $Al_2O_3$, and the $Y_2O_3$ and $Al_2O_3$ are present in an amount of less than 15 volume percent of the coating.

17 Claims, No Drawings

PROCESS FOR PRODUCING AN OXIDE DISPERSED MCRALY-BASED COATING

This application is a Continuation of prior U.S. application Ser. No. 08/264,888 filing date Jun. 24, 1994, now abandoned.

FIELD OF THE INVENTION

The invention relates to a process for thermal spraying a MCrAlY-based powder composition onto a surface of a substrate using a gaseous fuel-oxygen mixture in which sufficient oxygen in the fuel mixture is used to form $Y_2O_3$ from a substantial portion of yttrium (Y) in the powder composition and to form $Al_2O_3$ from a minor portion of the aluminum (Al) in the powder composition.

BACKGROUND OF THE INVENTION

There are many good oxidation and corrosion resistant coatings used in industry for various applications and for use in various environments. Articles composed of iron-, cobalt-, or nickel-based superalloys have been developed for use in applications, such as aerospace applications, and for use as blades, vanes, seals and other components utilized in gas turbine engines. In these applications, it is important that the articles have sufficient protection against undue oxidation and sulfidation since such corrosion can affect the useful life of the article resulting in reduced performance and possible safety problems. Although various superalloys have a high degree of corrosion resistance, such resistance decreases when the superalloys are operated in or exposed to high temperature environments.

To increase the useful life of components made of alloys and superalloys, various coatings have been developed. Aluminide coatings were initially used to provide a corrosion resistant outer layer but such layer was observed to crack when subjected to mechanically or thermally induced strain. Another class of coatings developed was the MCrAlY overlay coatings where M represents a transition metal element such as iron, cobalt or nickel. The coatings have been found to be more effective than the aluminide coatings in extending the useful life of alloy components in high temperature environments.

A current problem with conventional MCrAlY coatings on superalloy substrates is interdiffusion of coating elements into the substrate and substrate elements into the coating after long times of high temperature exposure. The loss of coating aluminum to the substrate is noticed by an aluminide depletion layer in the coating. Certain substrate elements like titanium have been found to diffuse through the MCrAlY coating to the external surface oxide scale and to make said oxide scale less protective. It would be desirable to modify current MCrAlY coatings to reduce this interdiffusion effect.

Although MCrAlY has overall been a successful class of coatings having good oxidation and corrosion resistance for superalloys, improvements have been made to the MCrAlY coatings.

U.S. Pat. No. 3,993,454 discloses coatings which are particularly suited for the protection of nickel and cobalt superalloy articles at elevated temperatures. The protective nature of the coatings is due to the formation of an alumina layer on the surface of the coating which serves to reduce oxidation/corrosion. The coatings contain aluminum, chromium, and one metal chosen from the group consisting of nickel and cobalt or mixtures thereof. The coatings further contain a small controlled percentage of hafnium which serves to greatly improve the adherence and durability of the protective alumina film on the surface of the coating. U.S. Pat. No. 4,585,481 discloses a similar coating except that yttrium and hafnium are used together along with silicon.

It is an object of the present invention to provide a thermal spray process for producing a MCrAlY-based coating having an oxide dispersion throughout the coating.

Another object of the present invention is to provide a process for producing a MCrAlY-based coating using a detonation gun and wherein the coating has an oxide dispersion throughout.

Another object of the present invention is to provide a MCrAlY-based coating where Y is substantially in the $Y_2O_3$ form and a minor amount of the Al is in the $Al_{O3}$ form.

SUMMARY OF THE INVENTION

The invention relates to a process for producing a MCrAlY-based coating wherein M is selected from the group consisting of iron, cobalt, nickel and mixtures thereof, which comprises the thermal spraying, such as by detonation gun means, of a MCrAlY-based powder composition onto the surface of a substrate using a gaseous fuel-oxidant mixture comprising an oxidant and at least one combustible gas selected from the group of saturated and unsaturated hydrocarbons in which the atomic ratio of oxygen to carbon is between 1.045 to 1 and 1.10 to 1, preferably between 1.05 to 1 and 1.08 to 1, and most preferably about 1.06 to 1, and the coated layer having at least 70 percent of the yttrium component in the form of $Y_2O_3$ and up to 30 percent of the aluminum component in the form of $Al_2O_3$. Preferably, the oxygen should be present in the coating in an amount of at least 1.5 weight percent, more preferably at least about 2.5 weight percent. Generally, the maximum amount of oxygen should not exceed 4 weight percent of the coating.

Flame plating by means of detonation using a detonating gun can be used to produce coatings of this invention. Basically, the detonation gun consists of a fluid-cooled barrel having a small inner diameter of about one inch. Generally a mixture of oxygen and acetylene is fed into the gun along with a coating powder. The oxygen-acetylene fuel gas mixture is ignited to produce a detonation wave which travels down the barrel of the gun whereupon the coating material is heated and propelled out of the gun onto an article to be coated. U.S. Pat. No. 2,714,563 discloses a method and apparatus which utilizes detonation waves for flame coating. The disclosure of this U.S. Pat. No. 2,714,563 is incorporated herein by reference as if the disclosure was recited in full text in this specification. In some applications it may be desirable to dilute the oxygen-acetylene fuel mixture with an inert gas such as nitrogen or argon. The gaseous diluent has been found to reduce the flame temperature since it does not participate in the detonation reaction. U.S. Pat. No. 2,972,550 discloses the process of diluting the oxygen-acetylene fuel mixture to enable the detonation-plating process to be used with an increased number of coating compositions and also for new and more widely useful applications based on the coating obtainable. The disclosure of this U.S. Pat. No. 2,972,550 is incorporated herein by reference as if the disclosure was recited in full text in this specification. In other applications, a second combustible gas may be used along with acetylene, such gas preferably being propylene. The use of two combustible gases is disclosed in U.S. Pat. No. 4,902,539 which is incorporated herein by reference as if the disclosure was recited in full text in this specification.

A feature of the present invention is that a higher aluminum concentration can be used in the MCrAlY-based powder composition since some of the aluminum will react with the oxygen from the fuel mixture to form $Al_2O_3$. It was found that the life per mil of coating thickness is essentially proportional to the amount of aluminum in the coating. Thus a coating with 12 weight percent aluminum would be expected to last 50 percent longer than a coating with 8 percent aluminum. Alternately, the higher aluminum coatings will be capable of higher temperature exposure for the same life per mil. The oxide phases generated with the gaseous fuel-oxidant mixture and the MCrAlY-based powder composition occurs such that the oxygen will react preferably with the metallic elements having the highest free energy of oxide formation of the components of the coating. Yttrium and aluminum have the highest free energy of oxide formation of the elements in the typical McrAlY alloy and since yttrium has a higher free energy of oxide formation than aluminum, the yttrium will be substantially converted to $Y_2O_3$, such as 90 weight percent or greater, and a minor portion of aluminum will be converted to $Al_2O_3$, such as less than about 30 weight percent for a typical MCrAlY composition and an oxygen content of about 2 percent. Generally, the oxide dispersion in the coating should be less than 15 volume percent, preferably less than 10 volume percent and at least greater than 4 volume percent. Generally, less than 30 percent by weight of the aluminum should be converted to $Al_2O_3$ and preferably less than 25 percent by weight should be converted to $Al_2O_3$. Since the presence of aluminum is desired in the coating, the conversion of only a minor amount of the aluminum to $Al_2O_3$ will effectively reduce diffusion of the aluminum to the substrate material from the coating and effectively reduce diffusion of aluminum to the external surface where surface oxides will form during its intended use. This aluminum diffusion reaction has been seen and is considered a life-reducing mechanism for the coatings involved. It is believed that the formation of dispersed $Al_2O_3$ throughout the coating will effectively reduce diffusion of aluminum out of the coating so that the aluminum that remains in the coating will provide a longer life use of the coatings. In addition, a dispersed oxide phase will strengthen the coating at high temperature environments. In accordance with this invention, it is recommended to use a higher aluminum content in the MCrAlY-based powder composition to compensate for the minor amount that will form $Al_2O_3$. The coatings of this invention can be used as a single layer environmental MCrAlY-based coating or as an enhanced bondcoat for thermal barrier coatings. The powders for use in this invention are preferably powders made by the vacuum-melted argon-atomization process.

To control the portion of the aluminum that will form $Al_2O_3$, the atomic ratio of oxygen to carbon in the gaseous fuel-oxidant mixture can be adjusted between 1.045 to 1 and 1.10 to 1. The greater the proportion of oxygen in the fuel will convert more of the aluminum to $Al_2O_3$. Preferably the coating produced can be heat treated to further stabilize the formation of the oxides. The heat treatment could be conducted at 800° C. or above, preferably at 1000° C. or above for a time period to substantially stabilize the formation of the oxides. The time period of the heating step could be from 2 to 10 hours, preferably from 3 to 5 hours.

The MCrAlY powder composition of this invention could have chromium in an amount from 10 to 50 weight percent, preferably from 15 to 40 weight percent and most preferably from 17 to 30 weight percent, aluminum in an amount from 4 to 20 weight percent, preferably from 6 to 18 weight percent and most preferably from 7 to 16 weight percent, yttrium from 0.1 to 1.0 weight percent, preferably from 0.2 to 0.8 weight percent and most preferably from 0.2 to 0.6 weight percent, and balance being iron, cobalt, nickel or mixtures thereof. If desired, other components could be added to the powder composition such as scandium, thorium, lanthanum, silicon, hafnium, tantalum, tungsten, niobium, zirconium, ytterbium, cerium or mixtures thereof. The amount added would be varied dependent on the purpose of the addition but in most applications an amount between 0.5 to 10, preferably between 1 to 7 based on the weight of the MCrAlY powder composition would be suitable. Examples of suitable powder compositions are shown in Table 1.

TABLE 1

| COMPOSITION | Elements - weight percent of Composition | | | | | |
|---|---|---|---|---|---|---|
| | Co | Ni | Cr | Al | Y | Ta |
| NiCrAlY | — | Bal. | 15–25 | 7–14 | 0.1–1 | |
| CoCrAlY | Bal. | — | 10–50 | 4–12 | 0.1–1 | |
| NiCoCrAlY | 10–40 | Bal. | 17–30 | 7–16 | 0.1–1 | |
| CoCrAlYTa | 30–83 | — | 10–50 | 4–12 | 0.1–1 | 1–5 |
| NiCrAlYTa | — | 47–72 | 15–25 | 7–14 | 0.1–1 | 1–5 |

*Bal - balance of weight

The combustible gas of the gaseous fuel-oxidant mixture for this invention could be at least one gas from the group consisting of acetylene ($CH_2H_2$), propylene ($C_3H_6$), methane ($CH_4$), methyl acetylene ($C_3H_4$), propane ($C_3H_8$), ethane ($C_2H_6$), butadienes ($C_4H_6$), butylenes ($C_4H_8$), butanes ($C_4H_{10}$), cyclopropane ($C_3H_6$), propadiene ($C_3H_4$), cyclobutane ($C_4H_8$), and ethylene oxide ($C_2H_8O$). The preferred fuel mixture would comprise acetylene gas alone or mixed with at least one other combustible gas such as propylene.

If desired, an inert gas such as nitrogen could be added to the gaseous fuel mixture in an amount of 20 to 50, preferably 30 to 40 volume percent based on the volume of the combustible fuel and oxygen. Using a detonation gun, the flow rate of the gaseous fuel-oxidant mixture can vary between 10 to 14, preferably between 11 to 13 cubic feet per minute and the fire rate can vary from 4 to 10, preferably 7 to 9 times per second. The powder feed rate in the barrel could vary between 5 to 35, preferably between 15 to 25 grams per minute. The parameters would be selected so that the desired amount of oxygen would be available to react with the aluminum and yttrium to form the amount of $Al_2O_3$ and $Y_2O_3$ desired in the final coating.

Another method of producing the coating of this invention may be the high velocity oxy-fuel, including the so-called hypersonic flame spray coating processes. In these processes, oxygen and a fuel gas are continuously combusted thereby forming a high velocity gas stream into which the powdered material of the coating composition is injected. The powder particles are heated to near their melting point, accelerated and impinged upon the surface to be coated. Upon impact, the powder particles flow outward forming overlapping thin, lenticular particles and splats. When using the high velocity oxy-fuel technique with a carbon-containing type fuel for depositing the coating, then the oxygen to fuel ratio in cubic feet per hour should be between 9 to 1 and 4 to 1, preferably between 7 to 1 and 5 to 1. When using the high velocity oxy-fuel technique with a hydrogen fuel then the oxygen to hydrogen ratio, on the basis of moles of gas, should be greater than 0.5 to 1.

The coating materials of this invention are ideally suited for coating substrates made of materials such as titanium, steel, aluminum, nickel, cobalt, alloys thereof and the like.

EXAMPLE 1

Three coatings were prepared on Inconel alloy 718 (Ni 50–55%, Cr 17–21%, Al 0.20–0.80%, Ti 0.65–1.15%, Cb+Ta 4.75–5.50%, Mo 2.80–3.30%, C 0.08 max, Fe balance) substrate pins, heat treated (4 hours at 1975° F. in vacuum), finished smooth, and peened. Samples of each coating were run in two cyclic oxidation tests, at 1900° F. and 2000° F. In these tests, the coated pins were cycled into the hot zone for 50 minutes, then withdrawn to cool for 10 minutes. After the test the pins were cross-sectioned, mounted in epoxy and polished to reveal the extent of the surface oxide layer and the underlying aluminide depletion layer.

The three coatings were: Coating A made with a plasma torch with coaxial argon shielding; Coating B made with a detonation gun (D-Gun) at atomic ratio of oxygen to carbon of 1.06 to 1.00 using the identical powder lot used for the plasma torch Coating A; and Coating C made with a detonation gun at atomic ratio of oxygen to carbon of 1.06 to 1.00 using a powder which was identical to the powder lot used in Coating A except that additional aluminum was added to compensate for the amount of metallic aluminum that would be converted to aluminum oxide during the detonation gun process.

It was found (Table 2) that the baseline plasma torch coating gave good oxidation resistance, with small values of outer aluminide depletion and oxide scale thickness, indicative of a long-life coating. The D-gun version of the same powder had comparable life at 2000° F. but had significantly less oxidation resistance at 1900° F. This is likely due to the lesser residual aluminum in the metallic alloy of the coating, approximately 2 percent aluminum having been converted to aluminum oxide. At 2000° F., the oxide dispersion apparently helps maintain oxidation resistance in this coating despite the lower metallic aluminum. Finally, the D-gun coating made with the aluminum-compensated powder was found to be significantly better than either of the other coatings, especially apparent after long times of testing. It was depleted to only one-half the extent of the plasma coating after 250 hours at 1900° F. and was one-third less depleted after 160 hours at 2000° F. This coating had the benefit of high metallic aluminum content plus the coating process induced dispersion of aluminum oxide throughout the coating.

TABLE 2

| | | Average Outer Aluminide Depletion Zone Plus Oxide Scale Thickness (mils) | | | |
| --- | --- | --- | --- | --- | --- |
| | Oxygen: | 1900° F. | | 2000° F. | |
| Coating Device | Carbon ratio | 114 Hours | 250 Hours | 80 Hours | 160 Hours |
| *A-Plasma torch | — | .33 | .97 | .45 | .61 |
| *B)-D-Gun | 1.06 | .59 | ctg gone | .46 | .54 |
| **C)-D-Gun | 1.06 | .49 | .48 | .31 | .41 |

Powder Compositions:
*21.8 Co-17.2 Cr-12.5 Al-0.6 Y-balance Ni;
**22.2 Co-17.0 Cr-14.4 Al-0.7 Y-balance Ni

EXAMPLE 2

Three coatings were made using the aluminum-compensated powder with the detonation gun employing oxygen and propylene gas mixtures in varying proportions to produce different oxygen to carbon ratios. The coatings were on IN718 pins, and were heat treated and finished after coating and oxidation tested as described in Example 1.

It was found that at the low oxygen to carbon ratio of 1.00:1, the coatings were initially very oxidation resistant, as shown by the data of Table 3 at 114 hours at 1900° F. and 80 hours at 2000° F. At longer times, however, the coating has relatively high depletion values at both temperatures. At the 1.03:1 oxygen-carbon ratio the coating was more stable in long-term oxidation testing. At the 1.06:1 oxygen to carbon ratio the resultant coating had the best combination of low initial oxidation rate and long-term oxidation resistance.

TABLE 3

| | | Average Outer Aluminide Depletion Zone Plus Oxide Scale Thickness (mils) | | | |
| --- | --- | --- | --- | --- | --- |
| | Oxygen: | 1900° F. | | 2000° F. | |
| *D-gun Coating | Carbon ratio | 114 Hours | 250 Hours | 80 Hours | 160 Hours |
| A | 1.00:1 | .35 | 1.31 | .26 | .48 |
| B | 1.03:1 | .38 | .46 | .32 | .57 |
| C | 1.06:1 | .52 | .42 | .31 | .41 |

*Starting powder composition for all coatings: 22.2 Co-17 Cr-14.2 Al-0.7 Y-Bal Ni

EXAMPLE 3

Coating C of Example 2 was chemically analyzed for its oxygen and carbon content (Table 4). Based on the chemical analysis of the coating, the amount of $Y_2O_3$ and $Al_2O_3$ were calculated assuming equilibrium and that all oxygen was converted to the most stable oxides.

It was found that the detonation gun coating converted all the Y to $Y_2O_3$ and a minor amount of $Al_2O_3$. For example, Coating C had a calculated total dispersed oxide content of 9.1 vol. percent.

TABLE 4

| | Oxygen: | | | Calculated Vol. % | | | | |
| --- | --- | --- | --- | --- | --- | --- | --- | --- |
| | Carbon | Measured wt % | | % Y in | | | % Al in | |
| Coating | Ratio | Oxygen | Carbon | $Y_2O_3$ | $Y_2O_3$* | $Al_2O_3$ | Al* | $Al_2O_3$* |
| C D-Gun | 1.06:1 | 2.34 | 1.05 | 1.2 | 100 | 7.9 | 10.74 | 18.40 |
| Baseline Plasma Coating | — | 0.15 | 0.01 | 1.1 | 100.00 | 0 | 12.50 | 0 |

*percent by weight

What is claimed:

1. A process for producing a McrAlY-based coating wherein M is selected from the group consisting of iron, cobalt, nickel and mixtures thereof, which comprises the thermal spraying by detonation gun means of a McrAlY-based powder composition onto the surface of a substrate using a gaseous fuel-oxidant mixture comprising an oxidant and at least one combustible gas selected from the group of saturated and unsaturated hydrocarbons in which the atomic ratio of oxygen to carbon is between 1.045 to 1 and 1.10 to 1, with at least an amount of oxygen present so that the coating comprises at least 2.5 weight percent oxygen and the aluminum content of the McrAlY-based powder is compensated by an amount to offset the amount of aluminum converted to aluminum oxide during the thermal spraying.

2. The process of claim 1 wherein the atomic ratio of the oxygen to carbon of the gaseous mixture is between 1.05 to 1 and 1.08 to 1 and the aluminum content of the McrAlY-based powder is compensated by at least about 2 weight percent.

3. The process of claim 1 wherein after the coating is sprayed on the substrate, the coated substrate is heated to a temperature above 800° C. for a time period sufficient to stabilize the reaction of the oxygen from the fuel-oxidant mixture.

4. The process of claim 1 wherein said at least one combustible gas is selected from the group consisting of acetylene ($C_2H_2$), propylene ($C_3H_6$), methane ($CH_4$), methyl acetylene ($C_3H_4$), propane ($C_3H_8$), ethane ($C_2H_6$), butadienes ($C_4H_6$), butylenes ($C_4H_8$), butanes ($C_4H_{10}$), cyclopropane ($C_3H_6$), propadiene ($C_3H_4$), cyclobutane ($C_4H_8$), and ethylene oxide ($C_2H_8$).

5. The process of claim 4 wherein the combustible gas is a mixture of acetylene and propylene.

6. The process of claim 1 wherein the MCrAlY-based powder composition further contains at least one of the elements selected from the group of scandium, thorium, lanthanum, silicon, hafnium, tantalum, cerium, tungsten, niobium, zirconium and ytterbrium.

7. The process of claim 1 wherein the combustible gas is a mixture of acetylene and propylene and the atomic ratio of oxygen to carbon is between 1.05 to 1 and 1.10 to 1.

8. The process of claim 7 wherein the coating comprises less than about 4.0 weight percent oxygen.

9. The process of claim 1 wherein the combustible gas is a mixture of acetylene and propylene and the atomic ratio of oxygen to carbon is between 1.05 to 1 and 1.08 to 1; a substantial amount of the yttrium is converted to $Y_2O_3$; a minor amount of aluminum is converted to $Al_2O_3$, and the oxide phase of the aluminum and yttrium is less than 15 volume percent of the coating.

10. A process for producing a McrAlY-based coating wherein M is selected from the group consisting of iron, cobalt, nickel and mixtures thereof, which comprises the thermal spraying by high velocity oxy-fuel means of a McrAlY-based powder composition onto the surface of a substrate using a gaseous fuel-oxidant mixture comprising an oxidant and at least one combustible gas selected from the group of saturated and unsaturated hydrocarbons in which the oxygen to fuel ratio in cubic feet per hour is between 9 to 1 and 4 to 1; the aluminum content of the MCrAlY-based powder is compensated by an amount to offset the amount of aluminum converted to aluminum oxide during the thermal spraying and the coating comprises at least 2.5 weight percent oxygen.

11. The process of claim 10 wherein the oxygen to fuel ratio in cubic feet per hour is between 7 to 1 and 5 to 1.

12. The process of claim 10 wherein after the coated coating is sprayed on the substrate, the substrate is heated to a temperature above 800° C. for a time period sufficient to stabilize the reaction of the oxygen from the fuel-oxidant mixture.

13. The process of claim 10 wherein said at least one combustible gas is selected from the group consisting of acetylene ($C_2H_2$), propylene ($C_3H_6$), methane ($CH_4$), methyl acetylene ($C_3H_4$), propane ($C_3H_8$), ethane ($C_2H_6$), butadienes ($C_4H_6$), butylenes ($C_4H_8$), butanes ($C_4H_{10}$), cyclopropane ($C_3H_6$), propadiene ($C_3H_4$), cyclobutane ($C_4H_8$), and ethylene oxide ($C_2H_8$ O).

14. The process of claim 10 wherein the MCrAlY-based powder composition further contains at least one of the elements selected from the group of scandium, thorium, lanthanum, silicon, hafnium, tantalum, tungsten, niobium, zirconium, cerium and ytterbium.

15. A process for producing a McrAlY-based coating wherein M is selected from the group consisting of iron, cobalt, nickel and mixtures thereof, which comprises the thermal spraying by high velocity oxy-fuel means of a McrAlY-based powder composition onto the surface of a substrate using a gaseous fuel-oxidant mixture comprising an oxidant and hydrogen and the oxygen to hydrogen ratio on the basis of moles of gas is greater than 0.5 to 1; the aluminum content of the McrAlY-based powder is compensated by an amount to offset the amount of aluminum converted to aluminum oxide during the thermal spraying; and the coating comprises at least 1.5 weight percent oxygen.

16. The process of claim 15 wherein after the coating is sprayed on the substrate, the coated substrate is heated to a temperature above 800° C. for a time period sufficient to stabilize the reaction of the oxygen from the fuel-oxidant mixture.

17. The process of claim 15 wherein the MCrAlY-based powder composition further contains at least one of the elements selected from the group of scandium, thorium, lanthanum, silicon, hafnium, tantalum, tungsten, niobium, zirconium, cerium and ytterbrium.

* * * * *